United States Patent
Roberg

(10) Patent No.: US 8,875,481 B2
(45) Date of Patent: Nov. 4, 2014

(54) FRONT ATTACHMENT FOR SELF-PROPELLED HARVESTING MACHINE

(75) Inventor: Alfons Roberg, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 301 days.

(21) Appl. No.: 13/236,843

(22) Filed: Sep. 20, 2011

(65) Prior Publication Data

US 2012/0067018 A1 Mar. 22, 2012

(30) Foreign Application Priority Data

Sep. 21, 2010 (DE) .......................... 10 2010 037 667

(51) Int. Cl.
*A01D 34/83* (2006.01)
*A01D 34/835* (2006.01)

(52) U.S. Cl.
CPC ............ *A01D 34/83* (2013.01); *A01D 34/8355* (2013.01)
USPC .............................................. 56/291; 56/244

(58) Field of Classification Search
USPC ............. 56/53, 154, 178, 179, 244, 290, 291; 30/381–387; 474/238, 265
See application file for complete search history.

(56) References Cited

U.S. PATENT DOCUMENTS

| | | | | | |
|---|---|---|---|---|---|
| 2,648,358 A | * | 8/1953 | Lower | .............................. | 30/379 |
| 2,908,126 A | * | 10/1959 | Dyrdahl | .............................. | 56/1 |
| 2,971,316 A | * | 2/1961 | Wsewolod | ...................... | 56/208 |
| 3,509,704 A | * | 5/1970 | Henzman | ........................ | 56/291 |
| 3,641,751 A | * | 2/1972 | Locati et al. | ..................... | 56/291 |
| 4,164,835 A | * | 8/1979 | Conte | ............................. | 56/291 |
| 5,031,395 A | * | 7/1991 | Ohkanda et al. | ................ | 56/236 |
| 5,839,263 A | * | 11/1998 | Biernath et al. | ................ | 56/255 |
| 6,119,674 A | * | 9/2000 | Eriksson et al. | ................ | 125/21 |
| 2006/0042217 A1 | | 3/2006 | Buermann | | |

FOREIGN PATENT DOCUMENTS

EP 1 629 707 3/2006

* cited by examiner

*Primary Examiner* — Alicia Torres

(74) *Attorney, Agent, or Firm* — Michael J. Striker

(57) ABSTRACT

A front attachment for harvesting stalk-type crop for a self-propelled harvesting machine has at least one cutting device for cutting the stalk-type crop, at least one transverse conveying device for conveying the cut crop to an intake device of the harvesting machine, wherein the at least one cutting device is at least one continuously circulating carrier element having a cylindrical cross section and including at least one cutting element having a coating containing hard-material elements, and at least one pair of guide elements which drive and guide the at least one cutting device.

12 Claims, 6 Drawing Sheets

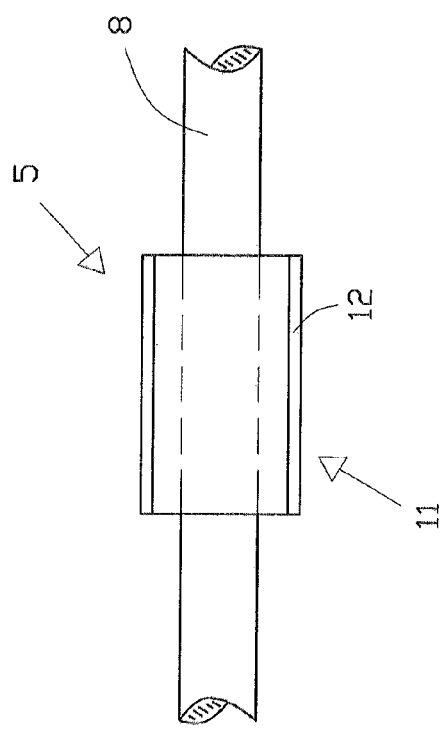
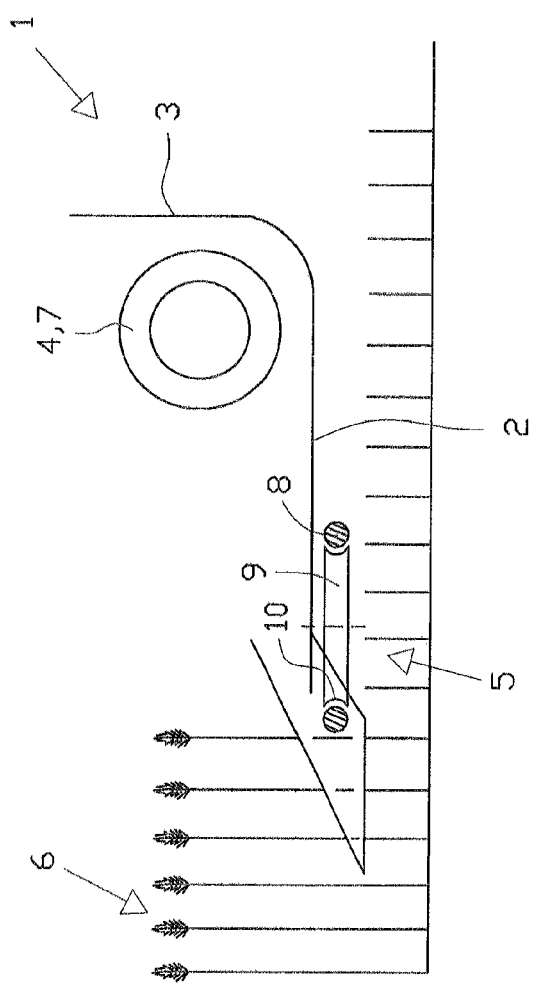

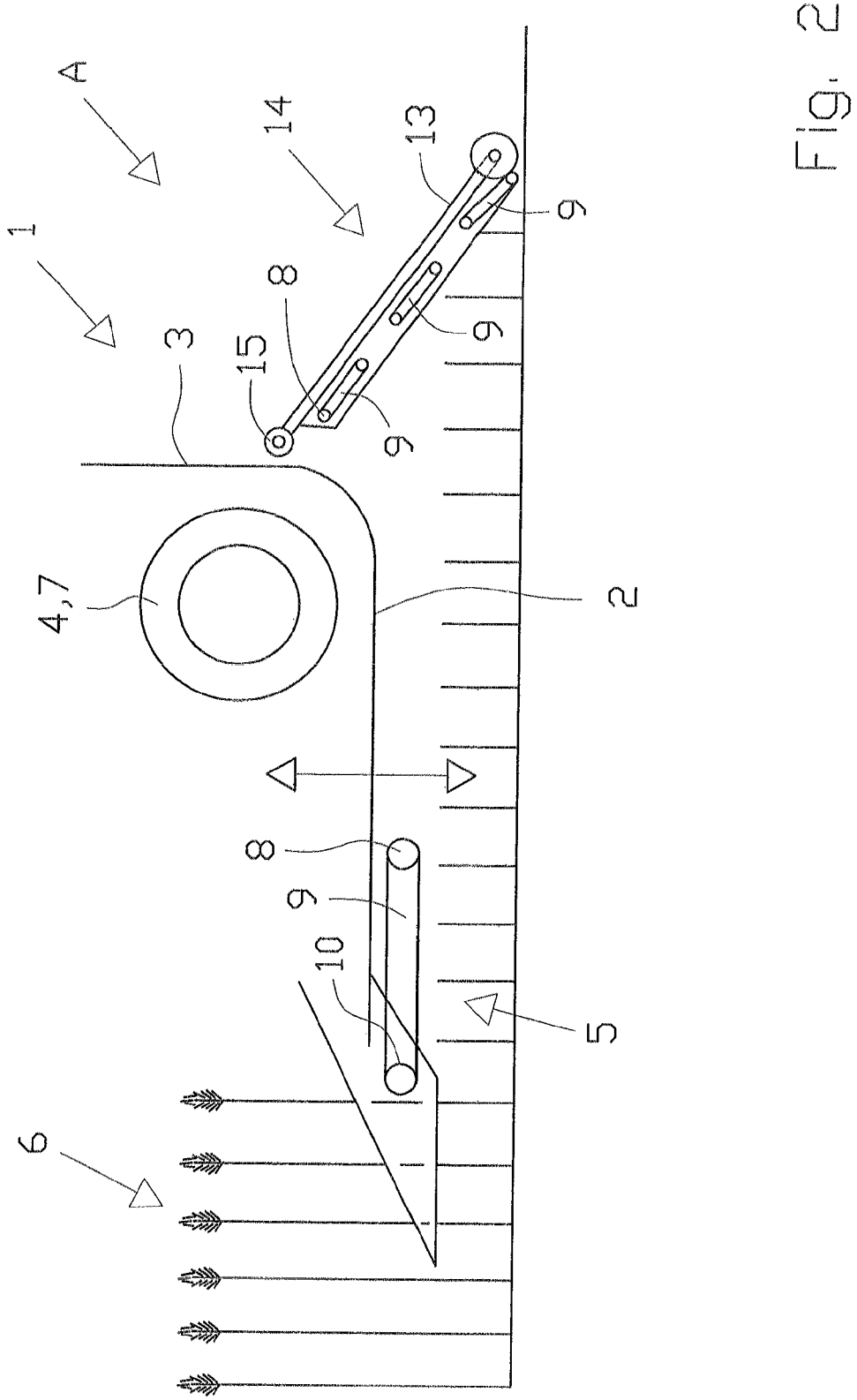

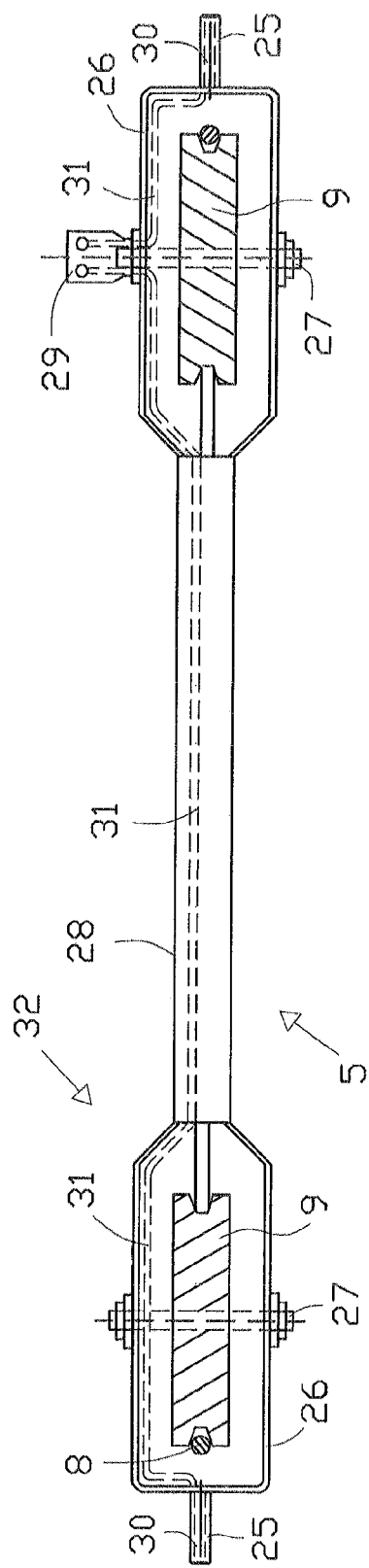

FRONT ATTACHMENT FOR SELF-PROPELLED HARVESTING MACHINE

CROSS-REFERENCE TO RELATED APPLICATION

The invention described and claimed hereinbelow is also described in German Patent Application DE 10 2010 037 667.1 filed on Sep. 21, 2010. This German Patent Application, whose subject matter is incorporated here by reference, provides the basis for a claim of priority of invention under 35 U.S.C. 119(a)-(d).

BACKGROUND OF THE INVENTION

The present invention relates to a front attachment for harvesting stalk-type crop for a self-propelled harvesting machine.

The generic document EP 1 629 707 A1 describes a front attachment for a self-propelled harvesting machine comprising a cutting device for cutting stalk-type crop, and a conveying device—in the form of a header auger—for conveying the cut crop to an intake device of the harvesting machine. The cutting device comprises two cutter bar sections, each of which is driven by a knife drive train, which are driven in an oscillating manner by the knife drive train. The oscillating drive of the cutter bar sections causes great transverse acceleration forces to be generated at the points where the motion changes direction, due to the inertia of the cutter bar sections.

SUMMARY OF THE INVENTION

The problem addressed by the present invention is therefore that of developing a front attachment of the initially stated type such that the occurrence of transverse accelerations on the at least one cutting device is prevented.

According to the present invention, the at least one cutting device is in the form of at least one continuously circulating carrier element having a cylindrical cross section, and which comprises at least one cutting element having a coating containing hard-material elements, wherein the front attachment comprises at least one pair of guide elements that are used to drive and guide the at least one cutting device. The continuously circulating cutting device does not require a reversing drive, thereby preventing transverse acceleration forces from occurring at the deflection points due to the inertia of the cutting device. Moreover, such a cutting device of a front attachment is characterized by lower weight than that of the cutter bar sections known from the prior art. A further advantage that results from the lower weight and elimination of the change in direction of motion is that the front attachment of the self-propelled harvesting machine can move across a field at a higher rate of speed since the cutting device can be operated at higher speeds.

Preferably, the cutting element can be hollow-cylindrical, and can be disposed on the carrier element concentrically to the longitudinal axis thereof. A cutting device thus configured makes it possible to cut stalk-type crop without a defined cutting plane being required, as is the case with blade-shaped cutting elements. A further advantage results from the weight reduction of the cutting device because the preferably sleeve-shaped cutting elements are mounted directly on the carrier element which has a cylindrical cross section and is designed in particular as a cord made of high-strength plastic or metal, thereby making it possible to eliminate complex fastening elements for attaching the cutting elements, as is required in the prior art. Preferably, the hollow-cylindrical cutting element has a shape that corresponds to the cylindrical cross section of the carrier element.

According to an alternative development, the cutting element can be designed as a fastening element comprising a cutting tooth disposed thereon and having a coating containing hard-material elements. The fastening element carries the cutting tooth and serves to hold it and guide it in a plane that is parallel to the circumferential direction of the carrier element. To attach the cutting element to the carrier element, the fastening element comprises a hollow-cylindrical section that enables concentric placement on the carrier element.

To guide the cutting element with the cutting tooth, the fastening element can be engaged with the guide elements in a form-fit manner, at least in sections. Due to the form-fit engagement of the fastening element with the guide elements, at least in sections, the particular cutting tooth can be guided in a defined plane. In a preferred development, at least one guide rail can be disposed between the guide elements and parallel to the carrier element on the side of the front attachment facing the crop to be cut, with which the fastening element can be engaged in a form-fit manner. In this manner, the cutting tooth is additionally held in a defined plane, in the region between the guide elements, to enable the crop to be cut in a uniform manner.

In particular, the coating containing hard-material elements can be in the form of a hard-metal layer which can contain diamond grit and/or ceramic particles.

Preferably, the at least one pair of guide elements can be disposed on the underside of the front attachment facing the base.

The at least one cutting device can be disposed on the front attachment, lying substantially in a horizontal plane and upstream of the conveying device. This placement of the cutting device on the front attachment is the classic positioning of the cutting device, instead of a conventional cutter bar section on a header.

In a preferred development of the front attachment, the cutting device can be disposed on the underside of the front attachment facing the base such that it can rotate about a horizontal axis. This placement makes it possible to use front attachments that are provided especially to harvest corn or sunflowers, for instance, i.e. corn pickers. A cutting device disposed in this manner on a front attachment provided for harvesting corn or sunflowers is used to replace conventional lower-deck choppers.

Furthermore, in a preferred development, a second cutting device can be disposed in a position on the front attachment that is downstream of the conveying device and is tilted at an angle relative to the cutting plane of the first cutting device. The second cutting device is used for high-cutting crop.

To this end, the second cutting device can have a plurality of parallel planes, via which a continuously circulating carrier element can be guided and driven by a plurality of guide elements disposed in pairs in a plane.

The invention is described in greater detail below with reference to embodiments shown in the drawings.

BRIEF DESCRIPTION OF THE DRAWINGS

FIG. 1 a side view of a schematically depicted header comprising a cutting device;

FIG. 1A shows a detailed view of a cutting element of the cutting device according to FIG. 1;

FIG. 2 shows a side view of a second embodiment of the schematically depicted header according to FIG. 1;

FIG. 6 shows a schematicized depiction of an embodiment of a cutting device as a lower-deck chopping device for a corn picker.

DESCRIPTION OF THE PREFERRED EMBODIMENTS

Figure 3:
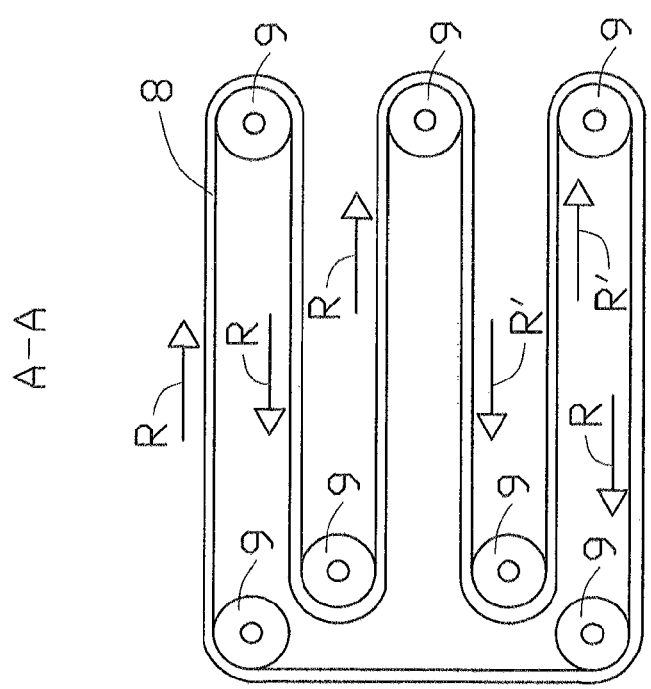
FIG. 3 shows a detailed view of a cutting device according to FIG. 2.

The schematicized depiction in FIG. 1 shows a side view of a header 1 for a self-propelled harvesting machine, in particular a combine harvester, which is detachably disposed on a feed rake of the combine harvester. Header 1 comprises a cutting table 2 with a header trough which is equipped with a side panel at each end. A rear panel 3 disposed vertically relative to the header trough extends between the side panels. At least one conveying device 4 is disposed above the header trough, approximately flush between the side panels, and is designed as a rotationally driven header auger. Conveying device 4 conveys cut, stalk-type crop 6 in the direction of the feeder housing of the combine harvester. Stalk-type crop 6 is cut by at least one cutting device 5 which is disposed underneath cutting table 2 and extends substantially parallel to the longitudinal axis of cutting table 2. A rotationally driven, height-adjustable reel, which is known per se and is therefore not depicted, is disposed above cutting table 2 upstream of conveying device 4 designed as header auger, with which the crop is deflected via cutting device 5 in the direction of the header trough.

According to the invention, cutting device 5 is in the form of a continuously circulating carrier element 8 having a cylindrical cross section and which, according to FIG. 1A, comprises at least one cutting element 11 having a coating 12 containing hard-material elements. Cutting device 5 is driven and guided by at least one pair of guide elements 9 which are likewise disposed below cutting table 2 on header 1, lying in a horizontal plane. Cutting device 5 can be driven hydraulically, electrically, or mechanically, preferably in the form of a belt drive.

Continuously circulating carrier element 8 is in the form of a cord, preferably a wire cable equipped with a large number of hollow cylindrical cutting elements 11 which preferably have an annular cross section, and which are disposed in rows on carrier element 8 concentrically to the longitudinal axis of carrier element 8, one behind the other with minimal separation. Sleeve-shaped cutting elements 11 have a coating 12 containing hard-material elements, contains diamond grit or ceramic particles and is in the form of a hard-metal layer. Carrier element 8, which is in the form of a wire cable, comprising cutting elements 11 thereon, rests in a form-fit manner in a recess 10 of guide element 9 corresponding to the cross section of cutting elements 11.

The schematicized depiction in FIG. 2 shows a side view of a second embodiment of header 1 according to FIG. 1. A second cutting device 14 is disposed on header 1, which can be used for high-cutting procedures. Second cutting device 14 is hinge-mounted on rear panel 3 of header 1 such that it can pivot about a horizontal swivel axis 15, and therefore second cutting device 14 is guided at a slant at an angle relative to the cutting plane of first cutting device 5. Second cutting device 14 differs from first cutting device 5 in that continuous carrier element 8 in the form of a wire cable is guided via a plurality of guide elements 9 which lie in a plurality of horizontal planes as seen in the vertical direction, which is shown in greater detail in FIG. 3, and which are disposed in a frame 13. First cutting device 5 cuts the crop just below the fruit, thereby leaving long stubble on the field. This long stubble is cut by second cutting device 14, which is disposed downstream of first cutting device 5 in the direction of motion of header 1, and comprises a plurality of cutting planes extending in the vertical direction, as shown in FIG. 3.

The depiction in FIG. 3 shows a schematicized, detailed view of second cutting device 14 in a top view according to arrow direction A. As seen in the vertical direction, continuous carrier element 8 is routed around guide elements 9 in a loop shape at a transition from one plane to the next higher plane, thereby resulting in a change in direction—in each plane relative to the previous plane—of continuously circulating carrier element 8 of second cutting device 14, as illustrated by directional arrow R.

Figure 4:
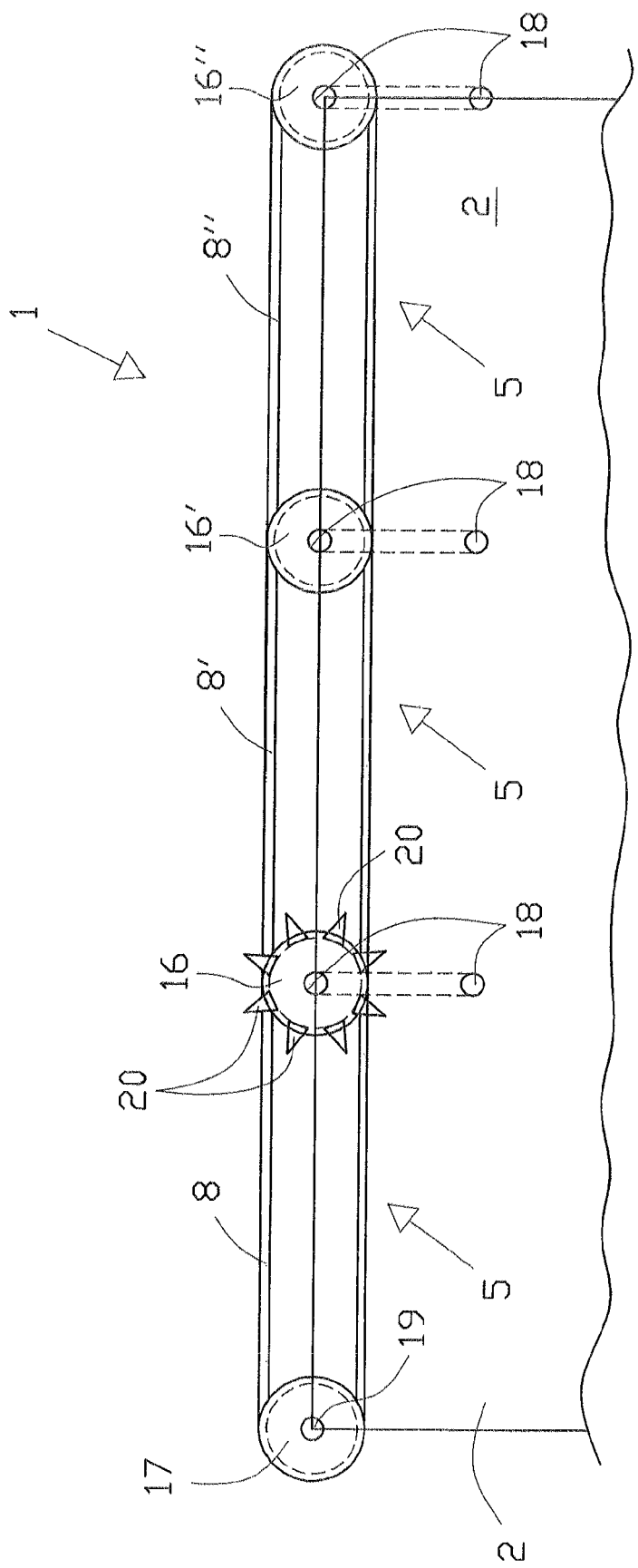
FIG. 4 shows a schematicized depiction of a third embodiment of the header according to FIG. 1.

A second embodiment of a front attachment according to FIG. 1, in the form of a header 1, is depicted in FIG. 4. A plurality of cutting devices 5 are disposed next to one another, extending across the width of header 1. To maintain the tensile stress of carrier elements 8 of cutting devices 5, header 1 comprises a stationary guide element 17 on an outer side, which serves as drive and guide means of cutting devices 5 and is fixedly disposed on a rotational axis 19 relative to cutting table 2. As seen in the longitudinal direction of header 1, further guide elements 16, 16', 16" are disposed with separation between them, each one being displaceable about a vertical axis 18 parallel and relative to header table 2. Proceeding from stationary guide element 17, a plurality of continuously circulating carrier elements 8, 8', 8" are provided, each of which surrounds two adjacent guide elements 17, 16; 16', 16". A first carrier element 8 surrounds fixed guide element 17 and first swivellable guide element 16.

Second carrier element 8' surrounds first displaceable guide element 16 and second displaceable guide element 16' adjacent thereto. This type of placement of carrier elements 8, 8', 8" continues along the entire width of header 1. The number of movable guide elements 16, 16', 16" depends on the total width of header 1. The task of displaceable guide elements 16, 16', 16" is to tension continuously circulating carrier elements 8, 8', 8" in order to guide and drive particular carrier element 8, 8', 8" one behind the other as seen in the longitudinal direction of header 1. Carrier element 8 is offset relative to downstream carrier element 8' as seen in the vertical direction, to prevent an overlap of carrier elements 8, 8' and 8', 8". First carrier element 8 therefore transmits the speed of driven, stationary guide element 17 to the next displaceable guide element 16. This vertically offset arrangement continues across the width of header 1, and so displaceable guide element 16 drives subsequent guide element 16' via carrier element 8'. To prevent losses in the cutting of crop 6 in the regions in which two carrier elements 8, 8'; 8', 8" are disposed on one movable guide element 16, 16' such that they overlap each other, guide elements 16, 16' disposed between the outer ends of header 1, at the least, can be equipped with additional knives 20 which rotate with guide elements 16, 16'.

Figure 5:
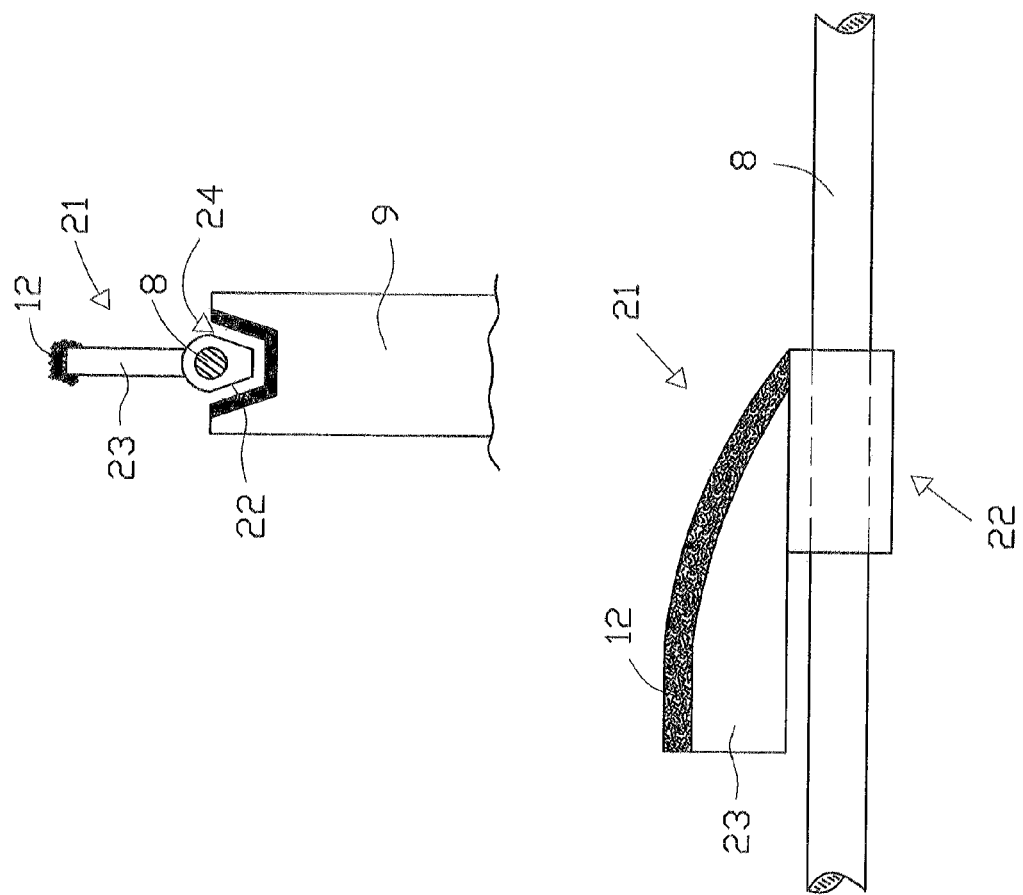
FIG. 5 shows a detailed view of a second embodiment of a cutting element according to FIG. 1.

FIG. 5 shows a detailed view of a second embodiment of a cutting element 21 according to FIG. 1A. Cutting element 21, which is shown in detail and is disposed concentrically to the longitudinal axis of carrier element 8, comprises a hollow cylindrical fastening element 22, with which cutting element 21 can be attached to carrier element 8. Furthermore, cutting element 21 comprises a cutting tooth 23 provided, at least in sections, with a coating 12 containing hard-material elements. Cutting tooth 23 has a substantially triangular contour which extends in the longitudinal direction of carrier element 8. At least one outer edge, which forms the cutting edge and rises from fastening element 22 onward, is provided with a coating 12 containing hard-material elements. To guide cutting element 21—which circulates with continuously circulating carrier element 8—in a consistent plane, fastening element 22 is designed in the shape of a truncated cone on the side thereof facing guide element 9. Fastening element 22 having the shape of a truncated cone is held in a form-fit manner in a recess 24 of guide element 9, which is substantially V-shaped and corresponds to the shape of fastening element 22, and is guided by same. Fastening element 22 and recess 24 of guide element 9 are composed—in their guide surfaces facing one another—of a pair of materials, such as a plastic and a metal.

The depiction in FIG. 6 shows a schematicized view of a further embodiment of cutting device 5 as a lower-deck chopping device of a corn picker, which is known per se and is not depicted. Cutting device 5 comprises at least one continuously circulating carrier element 8 which has a cylindrical cross section, and which comprises at least one cutting element 11 according to FIG. 1A having a coating containing hard-material elements, wherein cutting device 5 is disposed on the underside of the corn picker such that it can swivel about a horizontal axis. A retaining device 32 is provided for the swivellable support of cutting device 5 and for the drive thereof, which accommodates a bearing shaft 25 on each end face, about which retaining device 32 should be mounted on the corn picker in a swivellable manner. A substantially C-shaped frame element 26 adjoins particular bearing shaft 25, in which guide element 9 is mounted such that it can rotate about a vertical axis 27.

Frame elements 28 are interconnected by a brace 28. Particular frame element 26 is designed open on the diametrically opposed sides thereof, thereby enabling guide element 9 and carrier element 8 to rotate freely about brace 28. To drive at least one of the guide elements 9, vertical axis 27 is equipped with a hydraulic motor 29 which is supplied by a hydraulic circuit provided on the self-propelled harvesting machine. The hydraulic oil is supplied to hydraulic motor 29 through a rotary joint 30 in particular bearing shaft 25 and a hydraulic line 31 in frame element 26. The hydraulic oil flows from hydraulic motor 29 further via a hydraulic line 31 provided in brace 28 and adjoining further C-shaped frame element 26 to the hydraulic circuit of the self-propelled harvesting machine.

It will be understood that each of the elements described above, or two or more together, may also find a useful application in other types of constructions differing from the types described above.

While the invention has been illustrated and described as embodied in a front attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A front attachment for harvesting stalked crop for a self-propelled harvesting machine, comprising
at least one cutting device for cutting the stalked crop;
at least one transverse conveying device for conveying the cut crop to an intake device of the harvesting machine; and
at least one pair of guide elements which drive and guide said at least one cutting device;
wherein said at least one cutting device comprises at least one continuously circulating carrier element having a cylindrical cross section and at least one cutting element having a coating containing hard-material elements;
wherein said cutting element comprises a hollow cylindrical fastening element configured for attaching the cutting element to said carrier element concentrically to a longitudinal axis of said carrier element and, for guiding the cutting element in a plane that is parallel to a circumferential direction; and
wherein said hollow cylindrical fastening element is formed in a shape of a truncated cone on a side thereof facing the guide elements.

2. The front attachment as defined in claim 1, wherein said cutting element has a cutting tooth with the coating containing hard-material elements.

3. The front attachment as defined in claim 2, wherein said fastening element is engaged with said guide elements in a form-fit manner, at least in sections.

4. The front attachment as defined in claim 2, wherein said coating containing hard-material elements is a hard-metal layer.

5. The front attachment as defined in claim 2, wherein said coating containing hard-material elements contains diamond particles.

6. The front attachment as defined in claim 2, wherein said coating containing hard-material elements contains ceramic particles.

7. The front attachment as defined in claim 1, wherein said at least one pair of guide elements is disposed on a side of the front attachment facing a base.

8. The front attachment as defined in claim 1, wherein said cutting device is disposed lying in a substantially horizontal plane, upstream of said conveying device.

9. The front attachment as defined in claim 1, further comprising a second cutting device disposed in a position downstream of said conveying device and slanted at an angle relative to a cutting plane of said first cutting device.

10. The front attachment as defined in claim 9, wherein said second cutting device has a plurality of parallel planes, via which at least one of said continuously circulating carrier elements is guided and driven by a plurality of said guide elements disposed in pairs in a plane.

11. The front attachment as defined in claim 3, wherein said fastening element is held in the form-fit manner in a recess of said guide elements.

12. The front attachment as defined in claim 11, wherein said recess of said guide elements is substantially v-shaped, corresponds to the truncated cone shape of the fastening element and guides the fastening element thereby.

* * * * *